United States Patent Office 3,535,941
Patented Oct. 27, 1970

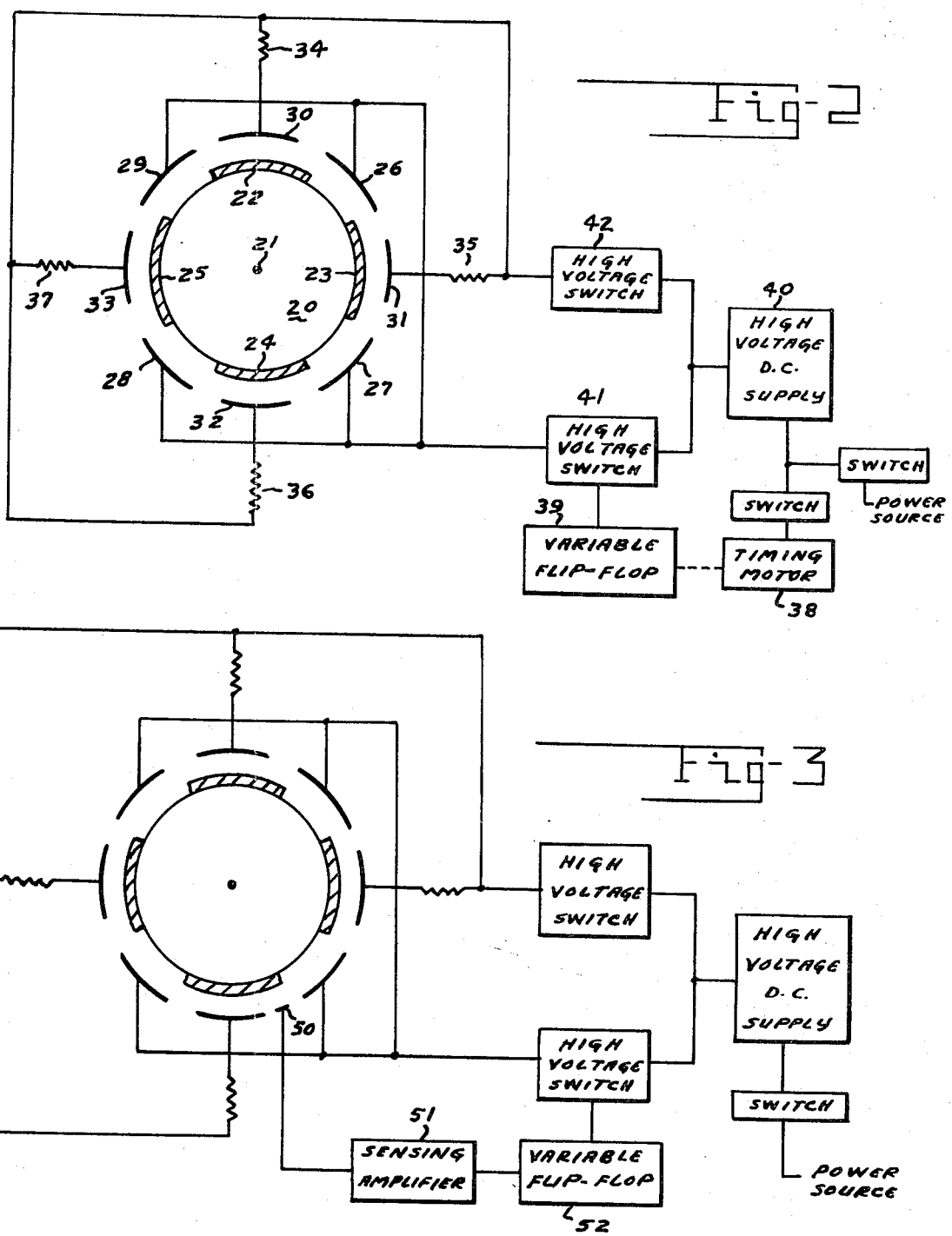

3,535,941
ELECTROSTATIC MOTOR AND NUTATION DAMPER FOR CRYOGENIC GYRO ROTOR
Francis R. Fowler, Wayne, Pa., and Carl G. Ringwall, Scotia, N.Y., assignors to the United States of America as represented by the Secretary of the Air Force
Filed Feb. 19, 1969, Ser. No. 800,563
Int. Cl. G01c 19/24
U.S. Cl. 74—5.5           4 Claims

ABSTRACT OF THE DISCLOSURE

Spin rotation is imparted to the rotor of a bodybound cryogenic gyroscope by an electrostatic field between the rotor, which has thin segments of projecting patches of dielectric material cemented thereto, and stationary segmented electrodes. Acceleration or deceleration torques are applied by commutating the electrostatic field. Nutation damping is applied to the rotor by an electrostatic field from a constant potential between the rotor and a separate set of segmented stationary electrodes utilizing the same dielectric patches.

BACKGROUND OF THE INVENTION

The field of this invention is in the art of gyroscopes and particularly that field of the art concerned with spinning and damping the rotors of cryogenic bodybound gyroscopes.

The advantages of a bodybound spinning sphere for the rotor of a gyroscope are well known. The patents of Iddings, 3,320,817; Biderman, 3,209,602; and Powell, 3,323,378 are representative examples of this art.

In the cryogenic art the property of superconducting materials to exclude or repel magnetic flux is well known. By virtue of this phenomena a closed superconducting surface such as a sphere will float on a magnetic field. The lines of magnetic flux of the field will be compressed by the weight of the ball, but they will not penetrate or be absorbed within the surface of the ball.

It is well known that the class of metals best exhibiting superconductivity are not the common noble metals such as copper and silver which high electrical conductivity is associated, but with metals such as tin, lead, mercury, tantalum, and niobium. These metals are superconducting only at temperatures approaching absolute zero. Heating a superconductor above its transition temperature will result in the loss of its superconductivity and it will become resistive. Below this transition temperature a superconductor is lossless so that no heat will originate from a current circulating within the superconductor. It is well known and has been demonstrated that closed superconducting circuits have been established in which circulating currents have persisted undiminished (measurably) over a period of years.

It is also known that a superconductor will become resistive in the presence of a magnetic field of sufficient strength, characteristic of the particular superconductive material. Thus a circulating current in the surface of a superconductor will produce a magnetic field adjacent to the surface proportional to the current, but a self current limit is reached above which the material is no longer superconducting due to the strength of the magnetic field created. This value of magnetic field at which a superconductor becomes resistive is known as the critical field value. This value of magnetic field strength is a function of temperature as well as a property of the material. FIG. 1 is a plot of the critical field versus temperature for a number of common superconductors. The intercept of these characteristic curves on the temperature axis gives the transition temperature of the particular material.

Gyroscopes having spherical niobium rotors operating in a vacuum at cryogenic temperatures using a magnetic field to support a freely spinning superconductor rotor have been constructed and are well known. No bearing support other than the magnetic field is employed. Once set in rotation in a highly evacuated enclosure, the extremely low friction losses and absence of torque coupling will provide continuous gyroscopic operation over extremely long periods of time, such as a month or longer. In these gyroscopes because of the absence of orientation between rotor and enclosure, the gyroscope rotor, after being brought up to speed coasts on its own momentum as a gyro rotor throughout the remainder of its performance of that run-up.

The methods of obtaining gyro information readout from spherical gyro rotors are well known, and will not be further delved into here other than to state that generally the optical method has been found to be preferable for the cryogenic gyro.

The greatly improved constancy of the angular momentum vector of the spherical superconducting spinning rotor of a bodybound cryogenic gyro over other bodybound spherical rotors is well recognized however, the problem of starting the rotor of a superconducting gyro and accelerating it to operating speed is one which has heretofore had no satisfactory solution. Because the electrical resistance of the rotor is zero, the induction motor technique used for the conventional electrostatic gyro does not work. The methods that have previously been used have been either to use jets of helium impinging on the rotor or to use a reluctance motor technique in which notches are cut into the rotor around its equator. Since it is desired to operate the rotor in a very high vacuum, the gas jet method has had the obvious drawback of requiring outgassing the gyro practically from ambient pressures after every start-up. In addition, there is no way to damp out the nutation or wobble of the rotor. The reluctance motor technique has the disadvantage that the notches on the rotor are a source of drift torque, since they destroy the sphericity of the superconducting surface of the rotor which is essential to low-drift performance.

SUMMARY OF THE INVENTION

The present invention provides an electrical means for starting and accelerating a superconducting rotor, for damping its nutation, and for applying controlling torques for the purpose of changing the direction of the spin axis, all without introducing any disturbance of the spherical superconducting rotor surface which would cause unwanted drift-producing torques. These results are accomplished by applying suitable patches of dielectric material to the rotor, which are acted upon by electrostatic fields to produce the desired accelerating, damping or controlling torques, but have no effect whatsoever on the magnetic field which supports the rotor.

The readout and magnetic bearing support techniques are well known and not a part of this invention.

BRIEF DESCRIPTION OF THE DRAWING

FIG. 2 is a block-pictorial representation of an embodiment of the invention having open loop control of the torque forces on the gyro rotor; and FIG. 3 is a block-pictorial representation of an embodiment of the invention having closed loop control of the torque forces on the gyro rotor.

DESCRIPTION OF THE PREFERRED EMBODIMENTS

Figure 1:
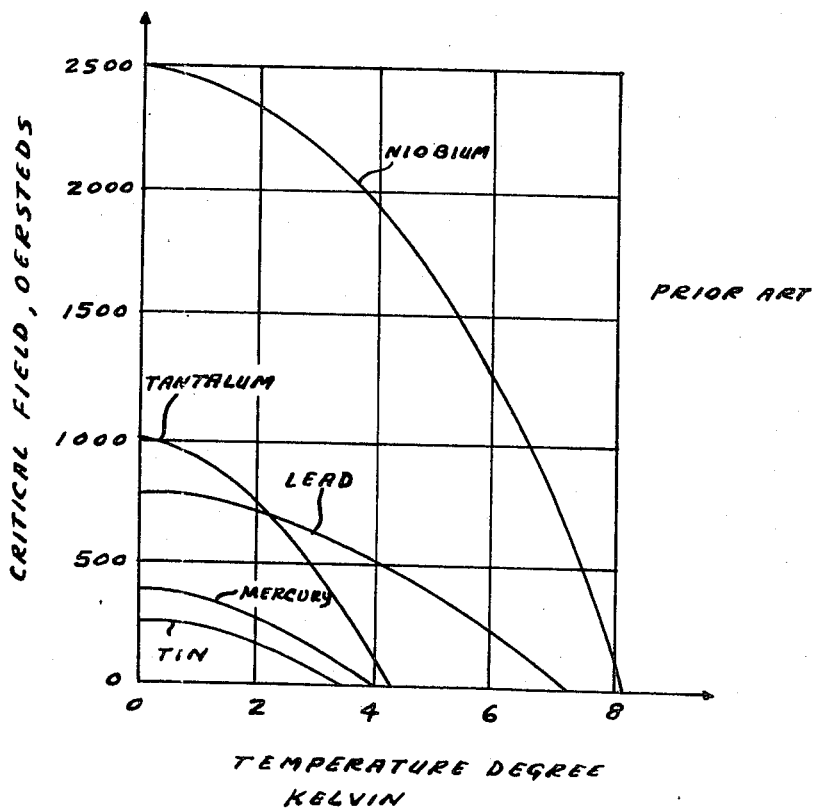
FIG. 1 is a plot of the relationships of critical magnetic fields to the cryogenic temperatures of common superconducting materials.

Referring to FIG. 2, the sperical niobium gyro rotor 20 is to be brought up to gyroscopic speed about a spin axis 21. The rotor 20 has thin, narrow dielectric patches 22, 23, 24, and 25 cemented around its desired equatorial spin axis. Capacitance plate segments 26, 27, 28, 29, 30, 31, 32, and 33 are of approximately the same width as the dielectric patches and are positioned in the gyro stator frame in the equatorial plane of the desired rotor spin axis. Segments 26 27, 28, and 29 are the acceleration and deceleration plate electrodes, and segments 30, 31, 32, and 33 are the nutation damping plate electrodes. Associated with the damping electrodes are the damping resistors 34, 35, 36, and 37. The torques involved are due to the change of capacitance in the electrostatic field between these electrodes and the rotor brought about by the dielectric patches on the rotor and they provide the desired operation of the device. It is to be understood that the rotor spins in a vacuum and that the gyro is maintained at a cryogenic temperature to provide superconductivity in the gyro rotor.

Before describing the structural details and theory of the invention, the method of operation of the embodiments shown in FIG. 2 and FIG. 3 will be described. The embodiments shown in FIG. 2 has open loop control circuitry. The gyro rotor is slave speed controlled by the timing motor 38. That is, the rotor is properly accelerated, taking into consideration its moment of inertia and the acceleration torques provided, by proportionally accelerating the commutation of voltage to the accelerating electrodes through the triggering action of the variable flip-flop 39 which is controlled by suitable mechanical coupling to the timing motor 38. Mechanical gearing from a constant speed motor actuating a multiturn rate triggering potentiometer in the flip-flop is a suitable timing drive system.

To put the gyro rotor in operation a satisfactory procedure is to apply the high voltage from the supply 40 to all the electrodes. This will properly align the equatorial axis of the rotor containing the dielectric patches with the axis of the electrodes. (The rotor is floating on the magnetic bearing suspension, of course.) The spin electrodes 26, 27, 28, and 29 are then switched off with the damping electrodes left on. The rotor will now line up with the dielectric patches oposite the damping electrodes. The damping electrodes are then manually momentarily switched off by actuating switch 42 and the spin electrodes turned on and the timing motor started. After an interval of time sufficient to allow the rotor to advance so that the dielectric patches have just passed the spin electrodes (the flip-flop has now removed the voltage from the spin electrodes), the damping potential is re-applied and from that time on stays on during the remainder of spin-up providing nutation damping. The spin potential is periodically applied and removed through the high voltage switch at progressively decreasing time intervals by the flip-flop and timing motor until the rotor is brought up to speed, at which time all drive and nutation electrostatic forces are removed and the rotor from then on coasts providing gyroscopic action. To decelerate the rotor the high voltage potential may be applied to all the electrodes, or the commutation cycle to the spin electrodes may be reversed and deceleration achieved at a controlled rate.

The operation of the embodiment shown in FIG. 3 is similar to that of FIG. 2 except that a closed accelerating control loop is employed. The sensing electrode 50 senses the presence or passing of a dielectric patch by the capacitance change between the electrode and the rotor due to the presence of the patch and through suitable amplification, 51, controls the triggering of the variable rate flip-flop 52. Operation of this embodiment is as follows. A fixed voltage is applied through the switches to all the electrodes for aligning the dielectric patches in the plane of the electrodes. The resulting torque may initially tend to cause oscillation through the plane, however it will soon be damped out through the damping provided by the damping resistors and the applied potential.

After centering, the voltage is then manually momentarily removed from the spin electrodes, the dielectric patches will then rotate the rotor in a direction so as to tend to align themselves with the damping electrodes. Just prior to that point where the patches are completely under the damping electrodes the sensing amplifier triggers the flip-flop so that high voltage is applied to the spin electrodes. The momentum of the rotor carries it through and rotation is commenced. Just before the patches become centered under the spin electrodes, the high voltage is automatically switched off the spin electrodes. This is accomplished by the sensing electrode determining the position of the rotor and through the sensing amplifier controlling the triggering of the flip-flop which actuates the high voltage switch. Again momentum carries the rotor forward. After each torque pulse the rotor is aligned and nutation damped by the torque forces from the electrostatic field acting on the dielectric patches, and the dissipation in the damping resistors.

A particular embodiment of this invention has the following parameters. A two-inch diameter spherical niobium rotor has four equally spaced 5-mil dielectric projections around the equator. The dielectric patch projections are each approximately ¼ inch wide and spanning approximately 45 degrees. The dielectric patches are fabricated from sodium silicate with a filler of titania. They are cemented in place by a conventional low temperature epoxy resin with small amounts of glycerine and a commercial wetting agent added. Typical values of the dielectric constant of this material is 18. The commutating electrodes are approximately ¼ inch wide and span approximately forty degrees. They are fabricated from a nonmagnetic material such as brass. The mean gap around the rotor is approximately 30 mils.

The torque at one dielectric patch for actuating the rotor may be calculated from the following expression:

$$T = 5V^2 \frac{dc}{d\theta}$$

where T is the torque in dyne cm./electrode, V is the voltage of the electrostatic field in kilovolts, and $dc/d\theta$ is the rate of change or capacitance in picofarads per radian.

The approximate change of capacitance in picofarads may be obtained from the following expression:

$$\Delta C = KA \left[ \frac{k}{d' + k(d-d')} - \frac{1}{d} \right]$$

where K is a constant of proportionality, A is the electrode area, $k$ is the dielectric constant of the patch, $d'$ is the height of the projection of the patch, and $d$ is the mean gap spacing to the rotor. Typical values of capacitance may range from about one-quarter to one-half picofarad.

The voltage creating the electrostatic field should be as large as practicable and yet preclude flash-over in the vacuum in which the rotor is operating. Voltage ranges of five to ten kilovolts have been generally suitable in the particular embodiment being described. Thus, in this specific embodiment, with a capacitance change of approximately one-quarter picofarad, the rate of change is approximately 0.3 picofarad per radian. With a ten kilovolts electrostatic field the torque at each accelerating electrode is approximately 150 dyne cm. per electrode. This results in an average total torque for the four electrodes of approximately 300 dyne cm.

The acceleration of the rotor may be expressed:

$$\alpha = \frac{T}{I}$$

where $\alpha$ is the acceleration in radians per second squared, T is the torque in dyne centimeters, and I is the moment of inertia of the rotor. Typical values of the moment of inertia of the rotor may range from about 200 to 500 dyne centimeters seconds squared, depending on the wall thickness of the rotor. With a 500 dyne cm. sec.² rotor in this embodiment and with the 300 dyne cm. torque, the acceleration is approximately 0.6 radian per second. This results in requiring approximately thirty minutes to accelerate the rotor to 10,000 r.p.m., and the initial time at startup for the patches to move from one set of electrodes to the other is approximately one and one-half seconds; the time the voltage is manually suppressed at startup.

The rotor is damped and nutation corrected by applying a fixed voltage to the damping electrodes through a fixed resistance. The transfer function relating the voltage on the damping electrode to the displacement of the projecting patch on the equatorial spin axis may be expressed:

$$\frac{E}{\theta} = E_B \left[ \frac{1 + pR(C + \Delta C)}{1 + pRC} \right]$$

where E is the voltage across the capacitance between the rotor and the damping electrode, $\theta$ is the angle of nutation, $E_B$ is the supply voltage (back of the damping resistor), $p$ is the differential operator of change with respect to time, R is the ohmic value of the damping resistor, C is the nominal capacitance across the gap (with the dielectric patch centered under the electrode), and $\Delta C$ is the change in capacitance due to the nutation.

The correcting force in dynes acting on the rotor to decrease the nutation is expressed by:

$$F = K E_B^2 \left[ \frac{1 + pR(C + \Delta C)}{1 + pRC} \right]^2$$

where K is a constant of proportionality.

The transfer function shows that a net leading phase shift is obtained, hence, the network gives damping. The damping is nonlinear in that it depends on the $\Delta C$, brought about by the amplitude of nutation or displacement of the equatorial flange containing the dielectric patches. Typical damping time to damp a peak-to-peak excursion of fifteen degrees is about 7 seconds in the detailed embodiments of this invention set forth herein.

We claim:

1. In a cryogenic gyroscope having a spherical bodybound superconducting rotor for rotation about a spin axis, the improvement for accelerating the rotor about the spin axis and providing nutation damping to the rotor comprising:
   (a) first capacitance means for providing a first electrostatic field for accelerating the said rotor;
   (b) second capacitance means for providing a second electrostatic field for damping the said rotor;
   (c) segmented dieletcric means attached to said rotor for creating a capacitance change in the said first and second electrostatic fields;
   (d) high voltage potential means cooperating with the said first and second capacitance means for generating the said electrostatic fields;
   (e) commutating means cooperating with the said high voltage means and the said first capacitance means for periodically applying and removing the high voltage potential from the first capacitance means for accelerating the rotor; and
   (f) resistive means cooperating with the high voltage means and the second capacitance means for providing dissipation and nutation damping.

2. The apparatus as claimed in claim 1 wherein the said segmented dielectric means is attached at the equatorial spin axis of the gyro rotor.

3. The apparatus for spinning abtut a spin axis and nutation damping the spherical bodybound superconducting rotor of a cryogenic gyroscope comprising:
   (a) a plurality of thin equally spaced dielectric projections attached to the surface of the said spherical rotor at the equator of the said spin axis;
   (b) a first plurality of equally spaced capacitance plates in one-to-one correspondence with the said dielectric projections positioned exterior the rotor in the equatorial plane of the said rotor spin axis;
   (c) a second plurality of equally spaced capacitance plates in one-to-one correspondence with the said dielectric projections positioned exterior the rotor in the equatorial plane of the said rotor spin axis;
   (d) a plurality of electrical resistances in one-to-one correspondence and connected respectively to each of the said second plurality of capacitance plates;
   (e) a fixed high voltage potential;
   (f) means for connecting the said high voltage potential to each of the said electrical resistances; and
   (g) high voltage switch means cooperating with the said high voltage potential and the said first plurality of capacitance plates for applying the said potential to the said plates when the said dielectric projections are essentially centered adjacent the said second plurality of capacitance plates and removing the potential when the said dielectric projections becomes essentially centered adjacent the said first plurality of capacitance plates.

4. The apparatus as claimed in claim 3 wherein the said high voltage switch means includes a sensing electrode adjacent to and exterior the said rotor, for detecting the angular position of the rotor with respect to its said spin axis.

References Cited

UNITED STATES PATENTS

| | | | |
|---|---|---|---|
| 2,846,888 | 8/1958 | Mosier | 74—5.5 |
| 3,098,679 | 7/1963 | De Boice | 74—5 XR |
| 3,221,563 | 12/1965 | Wing | 74—5 XR |
| 3,295,379 | 1/1967 | Jensen | 74—5.7 XR |
| 3,412,618 | 11/1968 | Staats | 74—5.7 |
| 3,418,500 | 12/1968 | Davis | 310—5 |
| 3,426,980 | 2/1969 | Caggiano et al. | 74—5.5 XR |

MANUEL A. ANTONAKAS, Primary Examiner

U.S. Cl. X.R.

74—5.7